(12) United States Patent
Gholmieh et al.

(10) Patent No.: US 9,161,161 B2
(45) Date of Patent: Oct. 13, 2015

(54) SELECTIVE COMMUNICATION MODE TRANSITIONING TECHNIQUES FOR MOBILE DEVICES

(71) Applicant: QUALCOMM Incorporated, San Diego, CA (US)

(72) Inventors: Aziz Gholmieh, Del Mar, CA (US); Srinivasan Balasubramanian, San Diego, CA (US); Arash Mirbagheri, San Diego, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/830,420

(22) Filed: Mar. 14, 2013

(65) Prior Publication Data

US 2014/0274141 A1    Sep. 18, 2014

(51) Int. Cl.
*H04W 24/00*  (2009.01)
*H04B 17/00*  (2015.01)
*H04W 4/02*   (2009.01)

(52) U.S. Cl.
CPC ..................................... *H04W 4/02* (2013.01)

(58) Field of Classification Search
CPC ................. H04W 12/06; H08W 8/26
USPC ............ 455/1, 439, 456.1, 422.1, 450, 456.3, 455/67.11; 700/97; 342/465
See application file for complete search history.

(56) References Cited

U.S. PATENT DOCUMENTS

| | | |
|---|---|---|
| 2010/0056177 A1* | 3/2010 | Kojima ..................... 455/456.1 |
| 2011/0275385 A1 | 11/2011 | Escolar-Piedras et al. |
| 2012/0040685 A1 | 2/2012 | Escolar-Piedras et al. |
| 2012/0122478 A1 | 5/2012 | Siomina et al. |
| 2012/0149392 A1 | 6/2012 | Siomina et al. |
| 2012/0190373 A1 | 7/2012 | Tenny |
| 2012/0190374 A1* | 7/2012 | Jo et al. ......................... 455/450 |
| 2012/0300701 A1 | 11/2012 | Uemura et al. |
| 2013/0005326 A1* | 1/2013 | Flanagan ................... 455/422.1 |

* cited by examiner

*Primary Examiner* — Kiet Doan
(74) *Attorney, Agent, or Firm* — Berkeley Law & Technology Group, LLP (57) ABSTRACT

Various methods, apparatuses and/or articles of manufacture are provided which may be implemented as part of a mobile device to selectively transition operation of the mobile device from one communication mode to another communication mode. For example, a mobile device may selectively transition operation from one communication mode to another communication mode based, at least in part, on a determination that certain signaling environment attributes which were previously experienced and identified may once again have been experienced and identified.

36 Claims, 4 Drawing Sheets

SELECTIVE COMMUNICATION MODE TRANSITIONING TECHNIQUES FOR MOBILE DEVICES

BACKGROUND

1. Field

The subject matter disclosed herein relates to electronic devices, and more particularly to methods, apparatuses and articles of manufacture for use by a mobile device to selectively transition operation from one communication mode to another communication mode.

2. Information

A variety of signal-based positioning techniques have been developed to allow for a location and/or a movement of a mobile device (e.g., such as a cell phone, a tracking device, etc.) to be estimated based on wireless signals that are transmitted by the mobile device and acquired by one or more external receivers, and/or wireless signals that are transmitted by one or more external transmitters and acquired by the mobile device.

For example, by measuring certain characteristics of one or more wireless signals that have been transmitted and acquired, it may be possible to determine a pseudorange or range between the transmitting and receiving antennas. For example, in certain implementations a propagation time may be determined which corresponds to an estimated range or pseudorange between a transmitter and receiver. Once a plurality of such ranges or pseudoranges to transmitting devices having known locations has been determined, then trilateration or other like known techniques may be implemented to determine an estimated location of the mobile device (e.g., location coordinates, etc.).

One example type of signal-based positioning technique that has been widely implemented to estimate a location of a mobile device is the global-based positioning system (GPS) which may be considered as supporting a satellite positioning system (SPS) capability. Here, for example, a SPS receiver may be provisioned within a mobile device to acquire SPS signals from a plurality of SPS transmitters having locations (e.g., positions in space) that may be known or determinable. Accordingly, mobile device with an SPS receiver may be capable of determining its estimated location (e.g., with regard to an earth centered, and/or other like coordinate system, etc.) based, at least in part, on a range or pseudorange between the SPS receiver and the applicable SPS transmitters.

Similar techniques may be implemented for various terrestrial transmitting devices, such as dedicated beacon transmitting devices, access devices that may be part of a cellular communications system or a wireless communication system (e.g., a wireless local area network, etc.), and/or the like or some combination thereof.

Indeed, in certain implementations, knowledge about an estimated location and/or movement of a mobile device may be beneficial to provide certain services to the mobile device. For example, such location/movement information may allow for a seamless handoff of a mobile device from one access device to another access device within a network/system, and/or possibly between different networks/systems. In another example, a mobile device may identify particular access devices that may be located near by and attempt to connect to one or more of the access devices. However, obtaining such location/movement information may consume limited time/computing resources, limited electrical power resources, etc.

Similarly, in certain situations, if a mobile device is unable to identify near by candidate access devices then the mobile device may consume limited time/computing resources, limited electrical power resources, etc., simply attempting to search for wireless signals transmitted by local candidate access devices to which the mobile device may attempt to establish a communication link. For example, a mobile device may consume such limited resources switching between different communication modes (e.g., which may be associated with different access devices, different communication technologies, etc.) in a search for wireless signals from one or more differently operated candidate access devices.

SUMMARY

In accordance with certain aspects, a method may be provided for implementation at a mobile device. The method may, for example, comprise: identifying an initial attribute of a signaling environment experienced by the mobile device located within or proximate to a coverage area of a first access device, the initial attribute being based, at least in part, on a wireless signal transmitted by a second access device and acquired by the mobile device; subsequently determining whether the mobile station is likely within or proximate to the coverage area based, at least in part, on the initial attribute and a current attribute of the signaling environment experienced by the mobile device, the current attribute being based, at least in part, on a subsequent wireless signal transmitted by the second access device and acquired by the mobile device; and in response to a determination that the mobile station is likely within or proximate to the coverage area, initiating an attempt to establish a wireless connection with the first access device.

In accordance with certain aspects, an apparatus may be provided for use in a mobile device. The apparatus may, for example, comprise: means for identifying an initial attribute of a signaling environment experienced by the mobile device located within or proximate to a coverage area of a first access device, the initial attribute being based, at least in part, on a wireless signal transmitted by a second access device and acquired by the mobile device; means for subsequently determining whether the mobile station is likely within or proximate to the coverage area based, at least in part, on the initial attribute and a current attribute of the signaling environment experienced by the mobile device, the current attribute being based, at least in part, on a subsequent wireless signal transmitted by the second access device and acquired by the mobile device; and means for initiating an attempt to establish a wireless connection with the first access device, in response to a determination that the mobile station is likely within or proximate to the coverage area.

In accordance with certain aspects an example mobile device may comprise: memory; a wireless communication interface; and a processing unit to: identify an initial attribute of a signaling environment experienced by the mobile device via the wireless communication interface located within or proximate to a coverage area of a first access device, the initial attribute being based, at least in part, on a wireless signal transmitted by a second access device and acquired by the mobile device via the wireless communication interface; store data and the memory representing at least the initial attribute; subsequently determine whether the mobile station is likely within or proximate to the coverage area device based, at least in part, on the stored data representing the initial attribute and further identified data representing a current attribute of the signaling environment experienced by the mobile device via the wireless communication interface, the current attribute being based, at least in part, on a subsequent wireless signal transmitted by the second access device and acquired by the mobile device via the wireless communication interface; and in response to a determination that the mobile station is likely within or proximate to the coverage area, initiate an attempt to establish a wireless connection with the first access device, via the wireless communication interface.

In accordance with certain aspects, an article of manufacturing may be provided which comprises a non-transitory computer readable medium having stored therein computer implementable instructions executable by a processing unit of a mobile device to: identify an initial attribute of a signaling environment experienced by the mobile device located within or proximate to a coverage area of a first access device, the initial attribute being based, at least in part, on a wireless signal transmitted by a second access device and acquired by the mobile device; subsequently determine whether the mobile station is likely within or proximate to the coverage area based, at least in part, on the initial attribute and a current attribute of the signaling environment experienced by the mobile device, the current attribute being based, at least in part, on a subsequent wireless signal transmitted by the second access device and acquired by the mobile device; and initiate an attempt to establish a wireless connection with the first access device, in response to a determination that the mobile station is likely within or proximate to the coverage area.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

A mobile device may be configured to communicate with one or more different types of access devices over one or more wireless communication links. For example, a mobile device may be configured to communicate with one or more different types of access devices (e.g., CDMA devices, LTE devices, base transceiver stations, macro-cell devices, femto-cell devices, pico-cell devices, other mobile devices, etc.) that may be part of, and/or otherwise augment, a cellular communication system. Indeed, certain mobile devices may be configured to communicate with different types of access devices that may be part of, and/or otherwise augment, a plurality of cellular communication systems. Additionally, for example, a mobile device may be configured to communicate over one or more different types of access devices (e.g., a WLAN access point, a Bluetooth access point, another mobile device, etc.) that may be part of, and/or otherwise augment, one or more wireless communication systems.

Since a mobile device may be moved about, the mobile device may be configured to switch from one wireless communication link to another wireless communication link. For example, a mobile device may be configured to switch from one wireless communication link supported by a first access device to a second wireless communication link supported by a second access device, e.g., as the mobile device moves away from the first access device and/or towards the second access device. Such "handoff" operations (e.g., hard handoffs, soft handoffs, etc.) in which a mobile device is operatively switched from one access device to another access device are well known and epitomize operation of most cellular communication systems, many satellite communication systems, and even some wireless communication systems, just to name a few examples. In certain instances, such example handoff operations may be initiated, handled, or otherwise coordinated, at least in part, using one or more network devices. In certain instances, such example handoff operations may be initiated, handled, or otherwise coordinated, at least in part, using a mobile device. Again, as mentioned, various techniques are well known for initiating, handling, and coordinating such handoff operations.

There may be times/situations, wherein a mobile device may need to reconfigure or otherwise affect in some manner one or more of its functions and/or circuits to switch from one wireless communication link to another wireless communication link, or to search (e.g., momentarily, periodically, etc.) for one or more other candidate access devices that the mobile device may consider accessing (e.g., switching to). For example, a mobile device may be configured in a first communication mode to support a first wireless communication link, and may be configured in a second communication mode to support a second wireless communication link. Thus, to switch from using a first wireless communication link to using a second wireless communication link may require a transition from a first communication mode to a second communication mode, assuming that the first and second communication modes are different. For example, a first communication mode may be different from a second communication mode based, at least in part, on the use of different frequency bands, different communication techniques, etc. Accordingly, a mobile device may reconfigure and/or otherwise affect in some manner one or more of its functions and/or circuits so as to acquire and/or search for one or more wireless communication links operating in a different frequency band, making use of a different communication technique or technology, etc., just to name a few examples.

Reconfiguring and/or otherwise affecting one or more functions and/or circuits within a mobile device may be necessary to support certain handoff operations (e.g., handoff operations that are well-planned and likely to succeed). However, in certain instances, reconfiguring and/or otherwise affecting one or more functions and/or circuits within a mobile device may prove less beneficial when used to search for and/or otherwise (unsuccessfully) attempt to connect to one or more access devices (e.g., to attempt to handoff operation, locate candidate access devices for possible handoff, etc.). For example, reconfiguring and/or otherwise affecting one or more functions and/or circuits within a mobile device may consume limited time/processing resources, available electrical power, etc., which may affect the efficiency of the mobile device, a user experience of the mobile device, etc.

Accordingly, with certain mobile devices it may be beneficial to apply techniques that may be more intelligent or selective with regard to switching from a first communication mode to the second communication mode, e.g., to search for and/or otherwise attempt to connect to one or more access devices. Thus, for example, if a mobile device is made aware of a specific location of an access device (or a coverage area of such access device) as well as its own estimated location then a mobile device may intelligently determine whether it should switch from a first communication mode to second communication mode to search for and/or otherwise attempt to connect to such access device. However, such techniques may be useless if a mobile device does not know or may be precluded from obtaining its own estimated location (independently, or with assistance). In still other instances, such techniques may be less beneficial as result of the mobile device having to use limited time/processing resources, available electrical power, etc., to obtain its estimated location, and/or that of potential candidate access devices.

In accordance with an aspect of the present description, various techniques are provided herein that may be implemented, at least in part, by a mobile device to selectively determine whether to switch from a first communication mode to second communication mode to search for and/or otherwise attempt to connect to such access device. As described in greater detail below, in certain instances the techniques provided herein may be performed without a mobile device necessarily having to know or obtain its estimated location and/or that of potential candidate access devices.

As presented herein, a mobile device may benefit by essentially "remembering" certain initial attributes of a signaling environment while it is within or proximate to a coverage area of a first access device. The remembered initial attributes may be obtained while the mobile device is operating in a communication mode that is different from that which may be used to connect to the first access device. The mobile device may, at some subsequent moment while operating in such different communication mode, experience something akin to "déjà vu", should one or more currently identified signaling environment attributes (current attributes) be considered to be the same as, or sufficiently similar to (e.g., within some threshold of), one or more of the remembered initial attributes. In other words, a mobile device may determine whether it is likely (again) within or proximate to the coverage area of the first access device based, at least in part on at least one initial attribute and at least one current attribute. As such, a mobile device may intelligently decide whether to transition to a communication mode that may allow it to search for and possibly connect to the first access device.

By way of an introduction, in one example technique a mobile device having determined that it is within, or possibly proximate to a coverage area (e.g., adjacent, within a threshold distance, etc.) of a particular access device (e.g., a first access device), may identify one or more initial attributes of a signaling environment experienced by the mobile device. Here, for example, an initial attribute may be based, at least in part, on one or more wireless signals transmitted by one or more other access devices (e.g., a second access device) and acquired by the mobile device. Subsequently, the mobile device may determine whether it is likely (again) within or proximate to the coverage area of the first access device based, at least in part, on the initial attribute(s) and one or more current attribute(s) of the signaling environment experienced by the mobile device. Here, for example, a current attribute may be based, at least in part, on a subsequent wireless signal transmitted by the second access device and acquired by the mobile device. In response to a determination that the mobile station is likely within or proximate to the coverage area of the first access device, the mobile device may initiate an attempt to establish a wireless connection with the first access device. In certain instances, an initial or current attribute may be based on one or more wireless signals from one or more second access devices. Further, as known, a relative position and/or the like of a mobile device may be determined based on determined range(s) to access device(s) having known or determinable positions.

Figure 1:
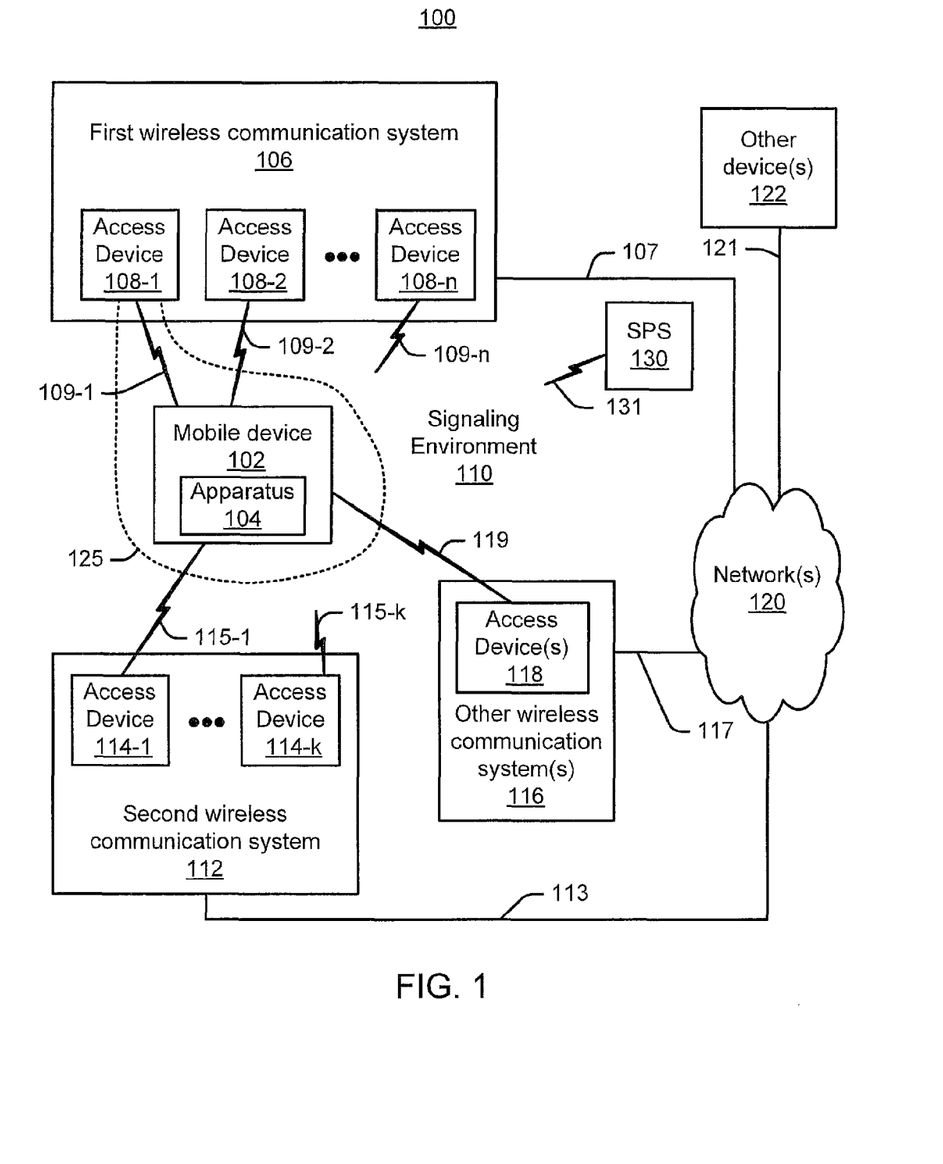
FIG. 1 is a schematic block diagram illustrating an arrangement of representative electronic devices and/or systems comprising a mobile device capable of operating in a plurality of communication modes and selectively transitioning between communication modes based, at least in part, on one or more identified attributes of the signaling environment experienced by the mobile device, in accordance with an example implementation.

With this in mind, attention is drawn to FIG. 1, which schematically illustrates an example arrangement 100 comprising various example devices and/or systems that may contribute to and/or otherwise experience, in some manner, signaling environment 110. By way of example, arrangement 100 comprises a mobile device 102 having an apparatus 104 that may be used, at least in part, to perform techniques as provided herein.

Mobile device 102 is intended to be representative of any electronic device that may be moved about in some manner and which may communicate with one or more other devices (e.g., access devices) via one or more wireless communication links. Thus, for example, in certain implementations mobile device 102 may represent a mobile computing and/or communication device such as cellular telephone, a smart phone, a tablet computer, a laptop computer, a gaming device, a wearable computer, a navigation device, a tracking device, a machine, a vehicle, etc.

Example arrangement 100 also includes a first wireless communication system 106, which may comprise one or more access devices. For example, as illustrated, first wireless communication system 106 comprises a plurality of access devices represented by access device 108-1, access device 108-2, . . . , through access device 108-$n$, where n represents an integer. Such access devices may, for example, exchange wireless signals with mobile device 102 over applicable wireless communication links. Thus, as illustrated in this example, access device 108-1 may transmit and/or receive wireless signals via wireless communication link 109-1, access device 108-2 may transmit and/or receive wireless signals by a wireless communication link 109-2, and excess device 108-$n$ may transmit and/or receive wireless signals via wireless communication link 109-$n$.

Similarly, for example arrangement 100 also includes a second wireless communication system 112, which may comprise one or more access devices, e.g., represented by access device 114-1 through access device 114-$k$ (where k represents an integer) which may transmit and/or receive wireless signals to/from mobile device 102 over wireless communication links 115-1 through 115-$k$, respectively. Further still, example arrangement 100 includes one or more other wireless communication system(s) 116, which may comprise one or more access device(s) 118, which might also be capable of transmitting and/or receiving wireless signals to/from mobile device 102, e.g. over representative wireless communication link 119.

Accordingly, as illustrated in example arrangement 100, a signaling environment 110 that may be experienced by mobile device 102, e.g. while located at a particular location at a particular moment in time, may be affected by one or more wireless communication signals, such as one or more wireless signals associated with wireless communication links 109-1 through 109-$n$, 115-1 through 115-$k$, and/or representative wireless communication link 119. Additionally, a signaling environment 110 may be affected by still other devices capable of transmitting (intentionally, or possibly even unintentionally) wireless signals that may be acquired by mobile device 102. By way of example, in certain implementations arrangement 100 may comprise one or more devices that transmit wireless signals in support of a location service capability, e.g., represented here by satellite positioning system (SPS) 130 transmitting one or more wireless signals over wireless communication link 131.

Although not illustrated, it should be understood that two or more of access devices 108-1 through 108-$n$ within first wireless communication system 106 may be interconnected via one or more wired and/or wireless communication links (not shown). Further, first wireless communication system 106 may be connected to one or more network(s) 120, e.g. as represented by communication link 107 which may comprise one or more wired and/or wireless communication links. Similarly, although not illustrated, it should be understood that two or more of access devices 114-1 through 114-$k$ within second wireless communication system 112 may be interconnected via one or more wired and/or wireless communication links (not shown). Additionally second wireless communication system 112 may be connected to one or more network(s) 120, e.g. as represented by communication link 113 which may comprise one or more wired and/or wireless communication links. Likewise, although not illustrated, it should be understood that two or more of access devices 118 within other wireless communication system(s) 116 may be interconnected via one or more wired and/or wireless communication links (not shown). Further, other wireless communication system(s) 116 may be connected to network(s) 120, e.g. as represented by communication link 117 which may comprise one or more wired and/or wireless communication links.

Network(s) 120 may comprise one or more communication systems and/or data networks having various interconnected devices supporting communication between various electronic devices/systems, e.g. as illustrated in example arrangement 100. In a particular implementation, network(s) 120 may comprise an Internet Protocol (IP) infrastructure and/or the like, which may be capable of facilitating communication between various electronic devices, e.g. as illustrated in example arrangement 100. Thus for example, network(s) 120 may comprise various electronic devices operatively coupled together by wired (including optical fiber) and/or wireless communication links and/or may comprise all or part of the Internet, a telephone system, and/or other like communication infrastructure.

As further illustrated in example arrangement 100, one or more other device(s) 122 may be connected to network(s) 120, e.g. as represented by communication link 121 which may comprise one or more wired and/or wireless communication links. Here, for example, other device(s) 122 may comprise one or more special computing platforms, storage devices, etc., which may be accessible via network(s) 120 to one or more other devices as illustrated in arrangement 100. Thus, for example, in certain implementations mobile device 102 may access one or more other device(s) 122 via one of the illustrated wireless communication systems and network(s) 120.

In certain example implementations, one or more of first wireless communication system 106, second wireless communication system 112 and/or other wireless communication system(s) 116 may comprise all or part of one or more wireless area networks.

In certain example implementations, one or more of first wireless communication system 106, second wireless communication system 112 and/or other wireless communication system(s) 116 may comprise all or part of one or more cellular communication networks.

In certain example implementations, a first access device of first wireless communication system 106, second wireless communication system 112, or other wireless communication system(s) 116 may comprise a wireless signal transceiver that is provisioned to operate in a first frequency band, use a first communication technique or technology, etc. A second access device of first wireless communication system 106, second wireless communication system 112, or other wireless communication system(s) 116 may comprise a wireless signal transceiver that is provisioned to operate in a second frequency band, use a second communication technique or technology, etc., which is different in some manner than the first frequency band, first communication technique or technology, etc.

In certain example implementations, such first access device and a second access device may be part of the same wireless communication system. For example, in certain instances a first access device may be provisioned, at least in part, to augment one or more other access devices within a wireless communication system. For example, in a cellular communication network, in certain regions one or more femto-cell, pico-cell, and/or other like repeater/extender access devices may be provided to augment one or more existing access devices (e.g., macro-cell devices, cellular base transceiver stations, WLAN access points, etc.). As such, such augmentation related access devices may be configured to transmit in a manner and/or frequency band that is selected to avoid or reduce interfering with wireless communication links of the supported and/or other neighboring access devices.

Accordingly and as previously mentioned, in certain instances mobile device 102 may be capable of selectively operating in different communication modes to support different wireless communication links and communicate with various applicable access devices. Indeed, in certain example implementations, mobile device 102 may need to affect certain internal functions and/or circuits accordingly to change communication modes, which may, for example make use of different frequency bands, different communication techniques or technologies, etc.

As further illustrated in arrangement 100, access device 108-1 is illustrated as having a coverage area 125 within which mobile device 102 is graphically illustrated as currently being located within or nearby. Consequently, as graphically illustrated, in such a location mobile device 102 may be capable of using wireless communication link 109-1 to communicate with access device 108-1. Additionally, as graphically illustrated, in such a location mobile device 102 may also be capable of acquiring wireless signals associated with wireless communication links 109-2, 115-1 and 119, but not necessarily being capable of acquiring wireless signals associated with wireless communication links 109-*n*, 115-*k*, and/or 131. Thus, in this example, signaling environment 110 experienced by mobile device 102 in such a location may comprise one or more wireless signals that are acquirable via wireless communication links 109-1, 109-2, 115-1, and 119.

As described in greater detail herein, it may be beneficial for mobile device 102 (e.g., via apparatus 104) to identify one or more initial attributes associated with signaling environment 110 at or about the time mobile device 102 is within or nearby coverage area 125 of access device 108-1. Such techniques may be of particular use when the coverage area 125 of access device 108-1 may be relatively small in comparison to the coverage areas of certain other nearby access devices, and/or in situations wherein a frequency band, communication technique or technology, etc., of wireless communication link 109-1 (for access device 108-1) may be different in some manner than one or more other nearby access devices. Such techniques may be of particular use when the location of access device 108-1 may be unknown and/or an estimated location of mobile device 102 may be unknown or less efficient to determine.

In certain example implementations, it may be beneficial for the one or more attributes associated with signaling environment 110 to correspond to one or more of the wireless signals that may be acquired from one or more of the other access devices at or about the time mobile device 102 is within or nearby coverage area 125 of (first) access device 108-1.

In an example implementation, mobile device 102 may initially determine that it is within coverage area 125 of first access device 108-1. In what may be the simplest manner, mobile device 102 may determine that it is within coverage area 125 of first access device 108-1 based, at least in part, on one or more wireless signals received from first access device 108-1, particularly if such wireless signals result from mobile device 102 being operatively connected to and making use of the services provided by and/or available through first access device 108-1. In other instances, such wireless signals may simply represent information transmitted by first access device 108-1 and received by the mobile device even though mobile device 102 may not be operatively connected to first access device 108-1.

In still other example implementations, mobile device 102 may determine that it is within coverage area 125 based, at least in part, on information regarding an expected coverage area of first access device 108-1. Thus, for example, mobile device 102 may obtain a directory of information regarding one or more access devices from one or more other devices, e.g., via wired and/or wireless communication links, a computer readable medium, etc. Such a directory of information may, for example, comprise one or more files comprising data, tables, maps, formulas, etc., that specify, at least in part, an expected location (e.g., map coordinates, etc.) of an access device and/or all or part of an expected coverage area for an access device. Accordingly, a mobile device may learn of its own estimated location (e.g., with assistance from one or more other devices), and/or determine its own estimated location, and compare such estimated location with one or more expected coverage areas for one or more access devices to determine whether it is within or proximate to a coverage area of a first access device.

In response to a determination that it is within coverage area 125 of first access device 108-1, a mobile device may, for example, identify an initial attribute of signaling environment 110 experienced by mobile device 102. Here, for example, such an initial attribute may be based, at least in part, on one or more wireless signals transmitted by one or more other access devices. Thus, for example, an initial attribute may be based, at least in part, on a wireless signal transmitted by a second access point 108-2 via wireless communication link 109-2 and acquired by the mobile device, while the mobile device is still within coverage area 125 (actual or expected) of first access device 108-1 and/or proximate to coverage area 125. Here, for example, if first access device 108-1 has an expected coverage area that extends ten meters outwardly from a point location (e.g., in a substantially an omni-directional pattern), mobile device 102 may be determined to be within such a coverage area if located within ten meters or less of the point location. In another example, if first access device 108-1 has an expected coverage area that extends twenty meters outwardly from a point location (e.g., in some particular pattern), mobile device 102 may be determined to be within such coverage area if located within twenty meters of the point location and within the particular pattern. Considering such examples, a mobile device may be determined to be within such a coverage area if estimated to be located within some threshold distance of an expected edge of a coverage area.

It should be kept in mind that in certain example implementations, mobile device 102 may determine that it is within coverage area 125 of first access device 108-1 based, at least in part, on actually being or having been recently in communication with first access device 108-1, e.g. via wireless communication link 109-1.

Further, in certain example implementations, mobile device 102 may determine that it is within coverage area 125 of first access device 108-1 based, at least in part, on being selectively capable of communicating with first access device 108-1 via wireless communication link 109-1, e.g. if so desired. In other words, mobile device 102 may, for example, determine that it is within coverage area 125 of first access device 108-1 if mobile device 102 may at such time establish communication with first access device 108-1 via wireless indication link 109-1.

It should be recognized that, while the term "area" is used herein with regard to a coverage capability of an access device, the term is intended to comprise two-dimensional or three-dimensional regions of space in the actual physical world and/or a corresponding representation thereof. Hence, in some example instances, such an area may correspond to a region represented in a two-dimensional electronic map, model, etc. (e.g., with x and y coordinates, latitude and longitude coordinates, etc.). In certain other example instances, such an area may correspond to a region of space in a three-dimensional electronic map, model, etc. (e.g., with x, y and z coordinates, latitude, longitude and altitude coordinates, etc.).

In accordance with certain example implementations, signaling environment 110 may comprise one or more various different types of wireless signals, e.g., position reference signal(s) (PRS(s)), LTE cell reference signal(s) (CRS(s)), etc. Accordingly, one or more signaling attributes may be based, at least in part, on one or more of the different types of signals, including possibly one or more PRS(s))), one or more LTE cell reference signal(s) (CRS(s)), etc.

In accordance with certain example implementations, an attribute of signaling environment 110 may be based, at least in part, on one or more of: a measured or estimated signal strength of the wireless signal, a measured or estimated phase of the wireless signal, a measured or estimated propagation distance of the wireless signal, a measured or estimated propagation time of the wireless signal, a measured or estimated time of arrival of the wireless signal, and/or the like or some combination thereof, just to name a few examples.

In accordance with certain example implementations, one or more initial attributes of signaling environment 110 may be used, at least in part, to establish one or more attribute thresholds and/or other like criteria which may be subsequently compared to and/or considered with one or more subsequently identified attributes of a subsequently experienced signaling environment, e.g. to determine whether mobile device 102 may (again) be within or nearby coverage area 125.

In accordance with certain example implementations, in initiating an attempt to establish a wireless connection with first access device 108-1, mobile device 102 may initiate a search for at least first access device 108-1. Thus for example, mobile device 102 may initiate a transition to a particular communication mode, e.g., possibly affecting one or more functions and/or circuits within mobile device 102.

In accordance with certain example implementations, in initiating an attempt to establish a wireless connection with first access device 108-1, mobile device 102 may affect an operation of a positioning function. Thus, for example, if mobile device 102 is attempting to obtain its estimated position, at least in part, through the use of a positioning function, then it may be beneficial to affect the operation of the positioning function while an attempt is made to establish a wireless connection with first access device 108-1. Hence, in certain instances operation of a positioning function may be temporarily halted or completely stopped while mobile device 102 attempts to establish, or in response to establishing, a wireless connection with first access device 108-1. It may be particularly useful to affect operation of a positioning function to conserve time/processing resources, available electrical power, etc.

In certain instances, if mobile device 102 is able to connect with first access device 108-1 then there may be no further reason to continue a positioning function attempting to estimate location of mobile device 102. Indeed, in certain instances, an estimated location of mobile device 102 may be based, at least in part, on its ability to connect with first access device 108-1. Thus, if mobile device 102 may be connected to first access device 108-1, then an estimated location of mobile device 102 may be based, at least in part, on a known location of the first access device 108-1.

Figure 2:
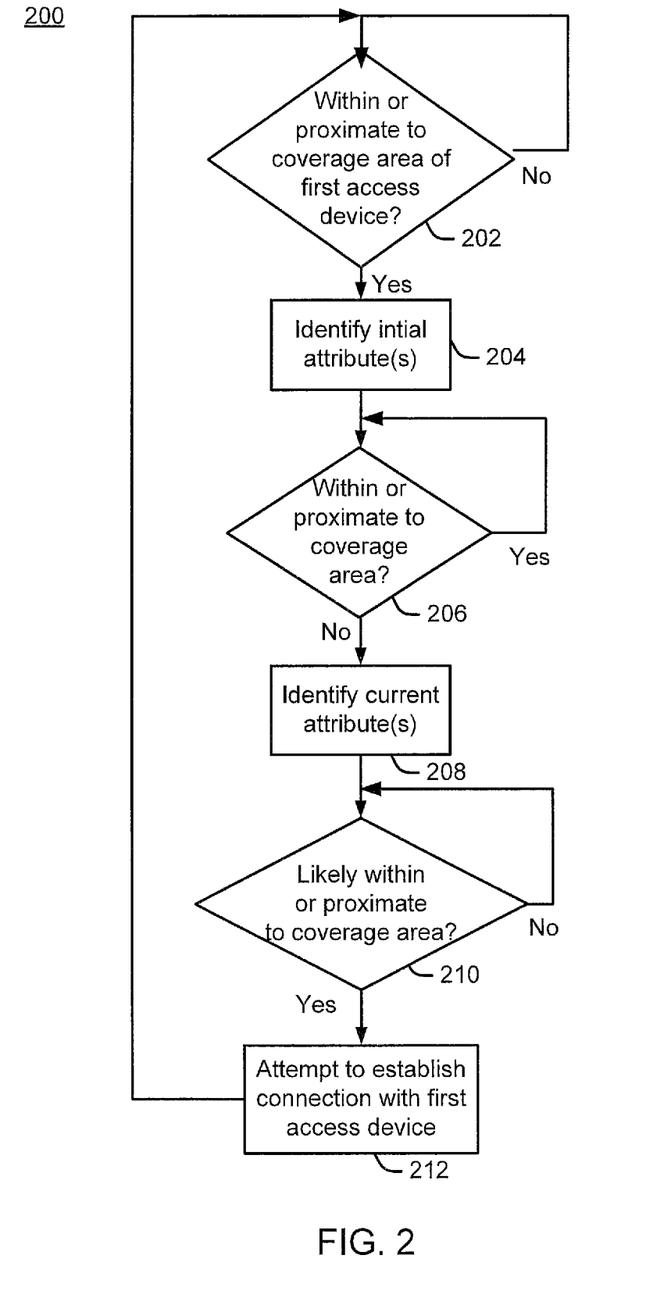
FIG. 2 is a flow diagram illustrating a process that may be implemented at least in part, via an apparatus in a mobile device, to selectively initiate a transition of the mobile device from one communication mode to another communication mode based, at least in part, on one or more identified attributes of the signaling environment experienced by the mobile device, in accordance with an example implementation.

Attention is drawn next to FIG. 2, which is a flow diagram illustrating an example process 200 that may be implemented, at least in part, by apparatus 104 of mobile device 102 (see FIG. 1).

It should be understood that prior to example block 202, in certain instances, mobile device 102 may have been connected to a particular wireless communication system, e.g., a large macro network and/or the like, and may have determined its location based, at least in part, on wireless signals acquired from access points of the particular wireless communication network. Accordingly, in certain instances mobile device 102 may determine that its location may allow for communication with a first access device 108-1. For example, mobile device 102 may obtain information identifying a coverage area of first access device 108-1 from one or more other devices. In certain instances, mobile device 102 may actively and/or passively search for the presence of such first access device 108-1. By way of example, in certain example implementations first access device 108-1 may represent a femtocell/pico-cell, and/or other like repeater/extender access device, etc., which may have a relatively smaller coverage area.

With this in mind, process 200 is intended to illustrate an example technique by which mobile device 102 may identify and remember certain initial attributes (e.g., regarding the macro network) while located within or proximate to the coverage area of first access device 108-1, such that at a later point in time current attributes may be identified and compared to the initial attributes to possibly determine whether the mobile device may once again be located within or near the coverage area of first access device 108-1. Accordingly, mobile device 102 may be able to subsequently avoid determining its position to determine whether it may be located within or proximate to the coverage area of first access device 108-1, and/or possibly avoid randomly or periodically attempting to search for first access device 108-1. Instead, mobile device 102 may recognize when current attributes appear similar enough to the remembered initial attributes that is may be likely that the mobile device is again within or proximate to the coverage area of first access device 108-1.

Hence, at example block 202, apparatus 104 may determine whether mobile device 102 is within or proximate to a coverage area of a first access device. Several example techniques have been previously described, which may be implemented at least in part by apparatus 104 in making the determination at example block 202. As illustrated by the "No" response, if the determination at example block 202 is that the mobile device is not within or proximate to a coverage area of the first access device, then at example block 202 may be repeated. As illustrated by a "Yes" response, if the determination at example block 202 is that the mobile device is within or proximate to a coverage area of the first access device then process 200 may continue at example block 204.

At example block 204, one or more initial attributes of the signaling environment experienced by the mobile device may be identified, at least in part, by apparatus 104. Again, several example attributes have been previously described which may be identified, at least in part, by apparatus 104 at example block 204. Additionally, as previously mentioned, one or more attribute thresholds may be based on one or more initial attributes. Hence, in certain implementations one or more initial attributes may comprise one or more attribute thresholds and/or the like, e.g., which may comprise one or more values, one or more ranges, one or more functions, and/or the like or some combination thereof, just to name a few examples. Further, in certain implementations one or more initial attributes may, for example, be stored as data and/or computer implementable instructions in a memory of a mobile device 102.

At example block 206, apparatus 104 may determine whether the mobile device is (still) within or proximate to the coverage area of the first access device. Similar techniques as used at example block 202 may be implemented, in whole or in part, by apparatus 104 at example block 206. As illustrated by the "Yes" response, if the determination at example block 206 is that the mobile device is within or proximate to the coverage area of the first access device, then at example block 206 may be repeated. To the contrary, as illustrated by a "No" response, if the determination at example block 206 is that the mobile device is not within or proximate to a coverage area of the first access device then process 200 may continue at example block 208.

At example block 208, one or more current attributes of the signaling environment being currently and/or recently experienced by the mobile device may be identified, at least in part, by apparatus 104. Again, several example attributes have been previously described which may be identified, at least in part, by apparatus 104 at example block 208. Further, in certain implementations one or more current attributes may, for example, be stored as data and/or computer implementable instructions in a memory of a mobile device 102.

At example block 210, apparatus 104 may determine whether the mobile device is (again) likely within or proximate to the coverage area (e.g., a known or expected coverage area) of the first access device. Here, for example, apparatus 104 may determine whether mobile device 102 is likely within or proximate to the coverage area of the first access device based, at least in part, on one or more of the initial attributes and one or more of the current attributes, e.g., as may be stored in memory. Thus, for example, in certain instances a comparison may be made between at least one initial attribute and/or attribute threshold and at least one corresponding current attribute to determine whether the mobile device is likely within or proximate to the coverage area of the first device. As illustrated by the "No" response, if the determination at example block 210 is that the mobile device is not likely within or proximate to the coverage area of the first access device, then at process 200 may continue at example block 208. As illustrated by a "Yes" response, if the determination at example block 206 is that the mobile device is likely within or proximate to a coverage area of the first access device then process 200 may continue at example block 212.

At example block 212, apparatus 104 may initiate an attempt by mobile device 102 to establish a connection with the first access device. Thus for example, at example block 212, mobile device 102 may transition from a first communication mode to second communication mode, wherein the second communication mode may allow for mobile device 102 to attempt to establish a connection with the first mobile device. In certain example implementations, an attempt to establish a connection with first access device may comprise a search for candidate access devices that may be connected to by mobile device 102 while in the second communication mode. In certain example implementations, example block 212 may further comprise affecting one or more other operations of mobile device 102. For example, in certain implementations example block 212 may affect an operation of a positioning function and/or the like. As further illustrated, process 200 may proceed from example block 212 to example block 202.

Figure 3:
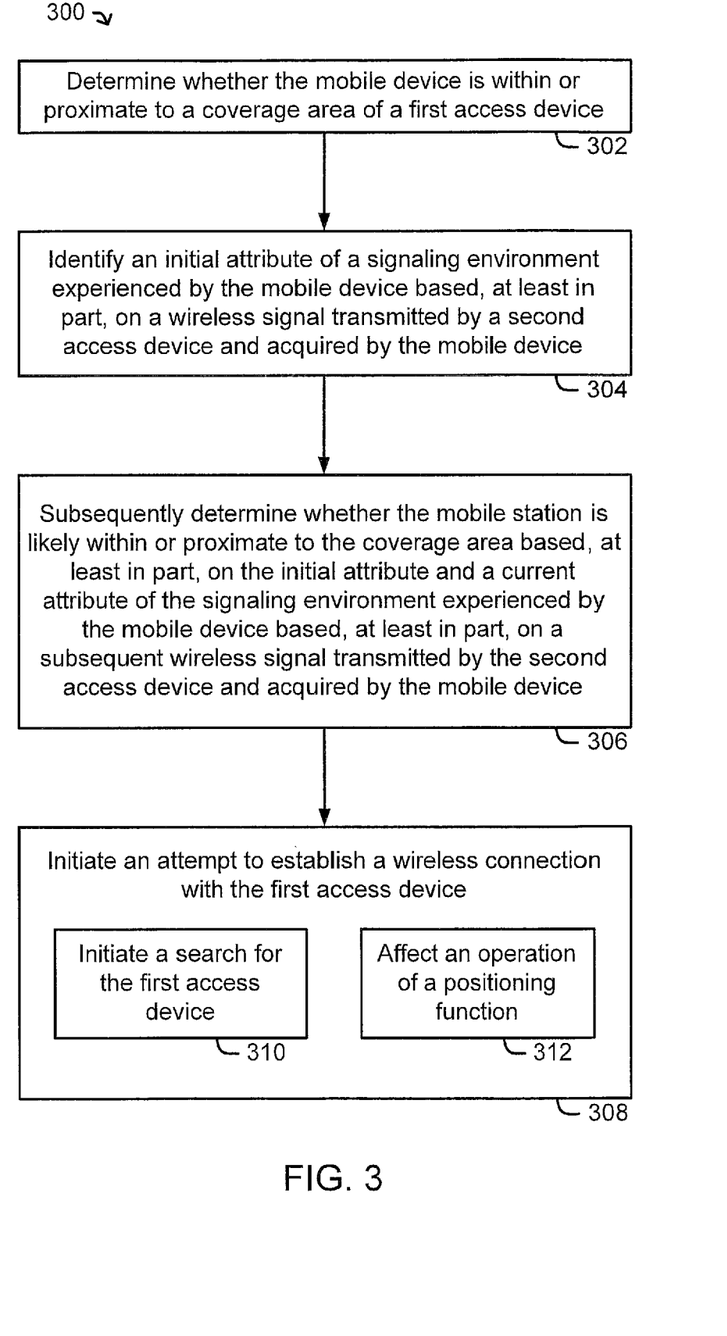
FIG. 3 is a flow diagram illustrating a process that may be implemented, at least in part, using one or more processing units provisioned within a mobile device to selectively initiate a transition of the mobile device from one communication mode to another communication mode based, at least in part, on one or more identified attributes of the signaling environment experienced by the mobile device, in accordance with an example implementation.

Attention is drawn next to FIG. 3, which is a flow diagram illustrating a process 300 that may be implemented, at least in part, by one or more processing units of a special purpose computing platform (e.g., provisioned within mobile device 102), e.g., executing computer implementable instructions.

In certain implementations, one or more processing units of mobile device 102 may be provided for specific use by apparatus 104. In certain other implementations one or more processing units of mobile device 102 may be provided for various different uses by mobile device 102, including at least part of the techniques provided by apparatus 104.

It should be understood that prior to example block 302, in certain instances, mobile device 102 may have been connected to a particular wireless communication system, e.g., a large macro network and/or the like, and may have determined its location based, at least in part, on wireless signals acquired from access points of the particular wireless communication network. Accordingly, in certain instances mobile device 102 may determine that its location may allow for communication with a first access device 108-1. For example, mobile device 102 may obtain information identifying a coverage area of first access device 108-1 from one or more other devices. In certain instances, mobile device 102 may actively and/or passively search for the presence of such first access device 108-1. By way of example, in certain example implementations first access device 108-1 may represent a femto-cell/pico-cell, and/or other like repeater/extender access device, etc., which may have a relatively smaller coverage area.

At example block 302, mobile device 102 may determine whether it is within or proximate to a coverage area of a first access device. As previously mentioned, mobile device 102 may determine whether it's within or proximate to the coverage area of a first access device using various techniques, e.g., some of which may consider whether mobile device 102 is or may be connected at the time to the first access device, and/or some of which may consider whether an estimated location of mobile device 102 falls within or proximate to the coverage area of the first mobile device. In certain instances, example block 302 may comprise all or part of example block 202 (see FIG. 2).

At example block 304, mobile device 102 may identify an initial attribute of a signaling environment experienced by the mobile device based, at least in part, on a wireless signal transmitted by a second access device and acquired by mobile device 102. As previously mentioned, various different attributes of a wireless signal and/or a combination of wireless signals may be identified (e.g., measured, estimated, gathered, modeled, etc.). Further, in certain example implementations, an initial attribute may comprise an attribute threshold which may assist in analysis of one or more subsequently obtained "current" attributes, e.g., at example block 306. In certain instances, example block 304 may comprise all or part of example block 204 (see FIG. 2).

At example block 306, mobile device 102 may subsequently determine whether it is likely within or proximate to the coverage area of the first access device based, at least in part, on the initial attribute(s) and a current attribute(s) of the signaling environment experienced by the mobile device. Here, the signaling environment experienced by mobile device 102 may be based, at least in part, on a subsequent wireless signal transmitted by the second access device (or one or more other access devices) and acquired by mobile device 102. In certain instances, example block 306 may comprise all or part of example blocks 208 and 210 (see FIG. 2).

At example block 308, mobile device 102 may initiate an attempt to establish a wireless connection with the first access device. Thus, for example, as previously mentioned mobile device 102 may selectively transition from a first communication mode to second communication mode which may allow for mobile device 102 to attempt to establish a connection with the first mobile device. In certain example implementations, at example block 310, an attempt to establish a connection with first access device may comprise initiating a search for at least the first access device and/or possibly other candidate access devices that may be connected to by mobile device 102 while in the second communication mode. In certain example implementations, at example block 312, an attempt to establish a connection with first access device may comprise affecting one or more other operations of mobile device 102, e.g., such as a positioning function and/or the like. In certain instances, example block 308 may comprise all or part of example block 212 (see FIG. 2).

Although not illustrated in FIG. 2 and/or FIG. 3, in certain example implementations, if available, additional information may be considered in determining whether to transition from one communication mode to another communication mode. By way of example, a determination to transition from one communication mode to another communication mode, e.g., at example blocks 210/212 and/or example blocks 306/308, may be based on additional information relating to an operation or expected operation of mobile device 102 and/or one or more of the access devices.

For example, in certain implementations, a determination to transition from one communication mode to communication mode may be based further, at least in part, on information regarding an estimated motion state of mobile device 102. For example, if an estimated motion state of mobile device 102 is indicative of the mobile device moving at a speed of velocity that exceeds some threshold value then initiating a transition may be less beneficial since the mobile device may rapidly pass right through or nearby the coverage area of the first access device. For example, in certain instances a mobile device 102 may or may not initiate a transition to one or more particular communication modes based, at least in part, on a desired power conservation setting, one or more ongoing operations, an operative experience/history (e.g., with regard to: the user of the mobile device, the first access device, other access devices, particular period(s) of time, etc.), user input(s), and/or the like or some combination thereof.

In accordance with certain further example implementations, a mobile device 102 may affect one or more attributes and/or decisions made using such attributes to account for known or expected variations in the operation of mobile device 102 and/or one or more of the access devices. For example, an attribute and/or decision made using such attribute may be affected in some way to account for known or expected changes in an antenna pattern and/or gain, a transmit power, signaling environment, etc. Thus, for example, mobile device 102 may affect one or more attributes and/or decisions made using such attributes to cancel access device changing its transmit power setting, antenna arrangement, etc. (e.g., based on time of day/date, etc.).

Figure 4:
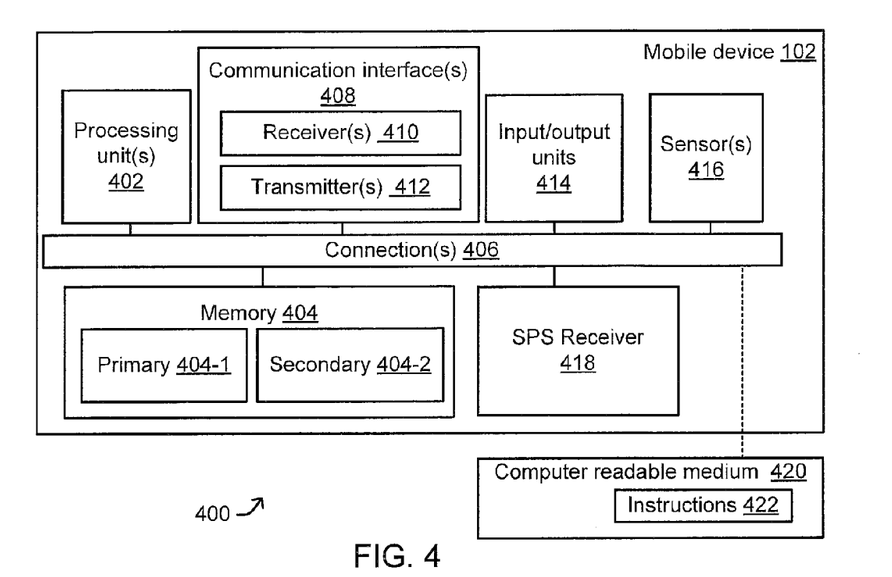
FIG. 4 is a schematic block diagram illustrating certain features of a computing platform that may be provisioned within a mobile device, e.g., as in FIG. 1, in accordance with an example implementation.

Attention is drawn next to FIG. 4, which is a schematic illustrating an example special computing platform 400 in the form of mobile device 102.

As illustrated special computing platform 400 may comprise one or more processing units 402 (e.g., to perform data processing in accordance with the techniques provided herein, and/or apparatus 104, etc.) coupled to memory 404 via one or more connections 406. Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located/coupled with processing unit(s) 402, or other like circuitry within mobile device 102. Secondary memory 404-2 may comprise, for example, the same or similar type of memory as primary memory and/or one or more data storage devices or systems, such as, for example, a disk drive, an optical disc drive, a tape drive, a solid motion state memory drive, etc In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special computing platform 400 may, for example, further comprise one or more communication interface(s) 408. Communication interface(s) 408 may, for example, comprise one or more radios, represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the radios function/capability.

Communication interface(s) 408 may, for example, be configurable in some manner to support mobile device 102 operating in at least one of a plurality of different communication modes.

Communication interface(s) 408 may, for example, provide connectivity to one or more access devices of first wireless communication system 106, one or more access devices of second wireless communication system 112, one or more access devices of other wireless communication system(s) 116, (see FIG. 1), e.g., via one or more wired and/or wireless communication links. Communication interface(s) 408 may implement one or more communication protocols as may be required to support one or more wired and/or wireless communication links and/or communication modes.

In certain example instances, mobile device 102 may comprise an SPS receiver 418 capable of acquiring and processing SPS signals 131 in support of one or more signal-based positioning capabilities/operations. In certain instances, signal-based positioning capability may provide identification of and/or affect some other process capable of identifying a current estimated motion state corresponding to a movement of mobile device 102 within the natural environment.

In accordance with certain example implementations, communication interface(s) 408, one or more access devices 108-1 through 108-n, one or more access devices 114-1 through 114-k, one or more access devices 118, and/or all or part of network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN. In another aspect, a wireless transmitting device may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Mobile device 102 may, for example, further comprise one or more input/output units 414. Input/output units 414 may represent one or more devices or other like mechanisms that may be used to obtain inputs from and/or provide outputs to one or more other devices and/or a user of mobile device 102. Thus, for example, input/output units 414 may comprise various buttons, switches, a touch pad, a trackball, a joystick, a touch screen, a microphone, a camera, and/or the like, which may be used to receive one or more user inputs. In certain instances, input/output units 414 may comprise various devices that may be used in producing a visual output, an audible output, and/or a tactile output for a user. For example, input/output units 414 may be used to present a solicitation to the user and to obtain certain corresponding user inputs.

Mobile device 102 may, for example, comprise one or more sensors 416. For example, sensor(s) 416 may represent one or more inertial sensors, one or more environmental sensors, etc., which may be useful in detecting aspects of the environment 108 and/or mobile device 102. Thus for example, sensor(s) 416 may comprise one or more accelerometers, one or one or more gyroscopes or gyrometers, one or more magnetometers and/or the like, one or more barometers, one or more thermometers, etc. Further, in certain instances sensor(s) 416 may comprise one or more input devices such as a microphone, a camera, a light sensor, etc. In certain instances, a sensor-based positioning capability may provide identification of and/or affect some other process capable of identifying a current estimated motion state corresponding to a movement of mobile device 102 within the natural environment.

SPS receiver 418 may be capable of acquiring and acquiring SPS signals 131 via one or more antennas (not shown). SPS receiver 418 may also process, in whole or in part, acquired SPS signals 131 for estimating a position or location, a speed and/or velocity, etc., of mobile device 102. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 402, memory 404, etc., in conjunction with SPS receiver 418. Storage of SPS or other signals for use in performing positioning operations may be performed in memory 404 or registers (not shown).

Sensors 416 may generate analog or digital signals that may be stored in memory 404 and processed by DPS(s) (not shown) or processing unit(s) 402 in support of one or more applications such as, for example, applications directed to positioning or navigation operations.

Processing unit(s) 402 may comprise a dedicated modem processor or the like that may be capable of performing baseband processing of signals acquired and downconverted at receiver(s) 410 of communication interface(s) 408 or SPS receiver 418. Similarly, a modem processor or the like may perform baseband processing of signals to be upconverted for transmission by wireless transmitter(s) 412. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect.

Figure 5:
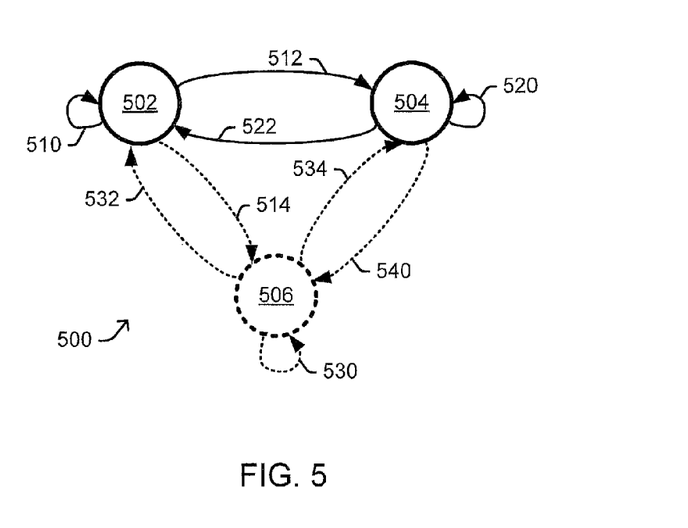
FIG. 5 is a state transition diagram illustrating a selective communication mode transition capability that may be performed by a mobile device, e.g., as in FIG. 1, in accordance with an example implementation.

Attention is drawn next to FIG. 5, which is a state transition diagram 500 illustrating an example selective communication mode transition capability that may be performed by mobile device 102.

State transition diagram 500 includes three example communication modes, namely, first communication mode 502, second communication mode 504, and third communication mode 506. It should be understood however, that mobile device 102 may be representative of a mobile device that may be capable of operating in two or more different communication modes. Hence, third communication link 506 is illustrated using a dashed line to represent that such additional communication mode(s) may be optional.

Furthermore, it should be understood that, as used herein, two communication modes may be considered different from one another if the mobile device in transitioning from one communication mode to another communication mode may reconfigure and/or otherwise affect in some manner one or more of its functions and/or circuits so as may be necessary to attempt to acquire and/or search for one or more wireless communication links operating in a different frequency band, making use of a different communication technique or technology, etc., just to name a few examples.

With this in mind, let us assume that first communication mode 502 allows mobile device 102 to connect with first access device 108-1 via wireless communication link 109-1, and second communication mode 504 allows mobile device 102 to connect with a second access device 108-2 via wireless communication link 109-2), e.g., as shown in FIG. 1. Similarly, let us assume that third communication mode 506 allows mobile device 102 to connect to another access device (e.g., access device 114-1, one of access device(s) 118) via an applicable wireless communication link (e.g., wireless communication link 115-1, wireless communication link 119.

Accordingly, in certain example implementations, first access device 108-1 may represent a femtocell/pico-cell, and/or other like repeater/extender access device that may be provisioned to support first wireless communication system 106, e.g., by augmenting a coverage area of second access device 108-2, which may comprise a cellular base transceiver station and/or the like. Here, for example, a coverage area 125 of first access device 108-1 may be significantly smaller than a coverage area (not shown) for second access device 108-2. Indeed, in certain instances, a coverage area (not shown) for second access device 108-2 may overlap all or part of coverage area 125. Nonetheless, it may be beneficial for mobile device 102 to connect to first access device 108-1 rather than second access device 108-2, if possible. However, as previously described, in certain implementations mobile device 102 may need to change from one communication mode to another communication mode to switch from using second access device 108-2 to search for and/or attempt to connect to first access device 108-1.

With this in mind, with regard to state diagram 500 let us assume that mobile device 102 is initially operating in communication mode 502 and connected to first access device 108-1. As such, act 510 may represent a period of active communication between mobile device 102 and first access device 108-1. As previously described, having determined that it is within or proximate to a coverage area of first access device 108-1, mobile device 102 may identify one or more initial attributes of signaling environment 110. Thus, for example, act 512 may represent a decision to transition to second communication mode 504, act 520 may represent a period of identifying such initial attributes, and act 522 may represent a decision to transition back to first communication mode 502. Similarly, for example, act 514 may represent a decision to transition to third communication mode 506, act 530 may represent a period of identifying such initial attributes, and act 532 may represent a decision to transition back to first communication mode 502. Also, act 534 may represent a decision to transition back to the second communication mode 504. In yet another example, act 512 may represent a decision to transition to second communication mode 504, act 520 may represent a period of identifying such initial attributes, act 540 may represent a decision to transition to third communication mode 506, act 530 may represent a period of identifying such initial attributes, and act 532 may represent a decision to transition back to first communication mode 502.

As previously described, mobile device 102 may subsequently determine whether it is likely within coverage area 125 based, at least in part, on the initial attribute(s) and one or more current attributes of the signaling environment it is experiencing. Thus, for example, let us assume that at a subsequent time mobile device is operating in second communication mode 504 and that act 520 represents may represent a period of active communication between mobile device 102 and second access device 108-2. Further, act 520 may represent an ability of mobile device 102 to identify one or more current attributes of signaling environment 110, e.g., as may be identified while operating in second communication mode 504. As such, in certain instances, mobile device 102 may be capable of determining whether it is likely within coverage area 125 based on act 520. However, in certain instances, had one or more of the initial attributes been identified while mobile device 102 was operating in third communication mode 506 then mobile device 102 may transition from second communication mode 504 to third communication mode 506, e.g., via act 540 and act 530 may represent an ability of mobile device 102 to identify one or more current attributes of signaling environment 110, e.g., as may be identified while operating in third communication mode 506. As such, in certain instances, mobile device 102 may be capable of determining whether it is likely within coverage area 125 based on act 520 and/or act 530.

Consequently, regardless as to whether mobile device 102 is operating in second communication mode 504 or third communication mode 506, upon a determination that mobile device 102 is likely (once again) within coverage area 125, mobile device 102 may transition to first communication mode 502 (e.g., act 522, act 532) and act 510 may represent an attempt to search for wireless signals from first access device 108-1, and/or to connect to first access device 108-1. If mobile device 102 is able to connect to first access device 108-1 at act 510, then mobile device 102 may continue to operate in first communication mode 502. Conversely, if mobile device 102 is unable to locate and/or connect to first access device 108-1 at act 510, then mobile device 102 may transition to second communication mode 504 via act 512, or possibly transition to third communication mode 506 via act 514.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing," "computing," "calculating," "determining", "generating", "obtaining", "modifying", "selecting," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
    identifying an initial attribute of a signaling environment observed by said mobile device located within or proximate to a coverage area of a first access device, said initial attribute being based, at least in part, on a wireless signal transmitted by a second access device and acquired by said mobile device;
    subsequently determining whether said mobile station is likely within or proximate to said coverage area based, at least in part, on said initial attribute and a current attribute of said signaling environment observed by said mobile device, said current attribute being based, at least in part, on a subsequent wireless signal transmitted by said second access device and acquired by said mobile device; and
    in response to a determination that said mobile station is likely within or proximate to said coverage area, initiating an attempt to establish a wireless connection with said first access device;
    wherein said first access device comprises a first wireless signal transceiver provisioned to operate in a first frequency band and said second access device comprises a second wireless signal transceiver provisioned to operate in a second frequency band.

2. The method as recited in claim 1, wherein said wireless signal transmitted by said second device comprises a position reference signal (PRS).

3. The method as recited in claim 1, wherein said initial attribute of said signaling environment is based, at least in part, on at least one of: a measured or estimated signal strength of said wireless signal, a measured or estimated phase of said wireless signal, a measured or estimated propagation distance of said wireless signal, a measured or estimated propagation time of said wireless signal, and/or a measured or estimated time of arrival of said wireless signal.

4. The method as recited in claim 1, wherein initiating said attempt to establish said wireless connection with said first access device further comprises:
    initiating a search for said first access device.

5. The method as recited in claim 1, wherein initiating said attempt to establish said wireless connection with said first access device further comprises:
    affecting an operation of a positioning function.

6. The method as recited in claim 1, wherein said first access device and said second access device are provisioned, at least in part, as part of a wireless communication system.

7. The method as recited in claim 6, wherein said first access device is provisioned, at least in part, to augment one or more other access devices of said wireless communication system.

8. The method as recited in claim 1, wherein said first access device is provisioned, at least in part, as part of a first wireless communication system, and said second access device is provisioned, at least in part, as part of a second wireless communication system.

9. The method as recited in claim 8, wherein said first wireless communication system comprises a wireless area network, and said second wireless communication system comprises a cellular communications network.

10. An apparatus for use in a mobile device, the apparatus comprising:
    means for identifying an initial attribute of a signaling environment observed by said mobile device located within or proximate to a coverage area of a first access device, said initial attribute being based, at least in part, on a wireless signal transmitted by a second access device and acquired by said mobile device;
    means for subsequently determining whether said mobile station is likely within or proximate to said coverage area based, at least in part, on said initial attribute and a current attribute of said signaling environment observed by said mobile device, said current attribute being based, at least in part, on a subsequent wireless signal transmitted by said second access device and acquired by said mobile device; and
    means for initiating an attempt to establish a wireless connection with said first access device, in response to a determination that said mobile station is likely within or proximate to said coverage area;
    means for said first access device comprises a first wireless signal transceiver provisioned to operate in a first frequency band and said second access device comprises a second wireless signal transceiver provisioned to operate in a second frequency band.

11. The apparatus as recited in claim 10, wherein said wireless signal transmitted by said second device comprises a position reference signal (PRS).

12. The apparatus as recited in claim 10, wherein said initial attribute of said signaling environment is based, at least in part, on at least one of: a measured or estimated signal strength of said wireless signal, a measured or estimated phase of said wireless signal, a measured or estimated propagation distance of said wireless signal, a measured or estimated propagation time of said wireless signal, and/or a measured or estimated time of arrival of said wireless signal.

13. The apparatus as recited in claim 10, wherein and further comprising:
    means for initiating a search for said first access device.

14. The apparatus as recited in claim 10, and further comprising:
means for affecting an operation of a positioning function.

15. The apparatus as recited in claim 10, wherein said first access device and said second access device are provisioned, at least in part, as part of a wireless communication system.

16. The apparatus as recited in claim 15, wherein said first access device is provisioned, at least in part, to augment one or more other access devices of said wireless communication system.

17. The apparatus as recited in claim 10, wherein said first access device is provisioned, at least in part, as part of a first wireless communication system, and said second access device is provisioned, at least in part, as part of a second wireless communication system.

18. The apparatus as recited in claim 17, wherein said first wireless communication system comprises a wireless area network, and said second wireless communication system comprises a cellular communications network.

19. A mobile device comprising:
memory;
a wireless communication interface;
a processing unit to:
identify an initial attribute of a signaling environment observed by said mobile device located within or proximate to a coverage area of a first access device via said wireless communication interface, said initial attribute being based, at least in part, on a wireless signal transmitted by a second access device and acquired by said mobile device via said wireless communication interface;
store data and said memory representing at least said initial attribute;
subsequently determine whether said mobile station is likely within or proximate to said coverage area based, at least in part, on said stored data representing said initial attribute and further identified data representing a current attribute of said signaling environment observed by said mobile device via said wireless communication interface, said current attribute being based, at least in part, on a subsequent wireless signal transmitted by said second access device and acquired by said mobile device via said wireless communication interface; and
in response to a determination that said mobile station is likely within or proximate to said coverage area, initiate an attempt to establish a wireless connection with said first access device, via said wireless communication interface;
wherein said first access device comprises a first wireless signal transceiver provisioned to operate in a first frequency band and said second access device comprises a second wireless signal transceiver provisioned to operate in a second frequency band.

20. The mobile device as recited in claim 19, wherein said wireless signal transmitted by said second device comprises a position reference signal (PRS).

21. The mobile device as recited in claim 19, wherein said initial attribute of said signaling environment is based, at least in part, on at least one of: a measured or estimated signal strength of said wireless signal, a measured or estimated phase of said wireless signal, a measured or estimated propagation distance of said wireless signal, a measured or estimated propagation time of said wireless signal, and/or a measured or estimated time of arrival of said wireless signal.

22. The mobile device as recited in claim 19, wherein, as part of said attempt to establish said wireless connection with said first access device, said processing unit to further:
initiate a search, via said wireless communication interface, for said first access device.

23. The mobile device as recited in claim 19, wherein, as part of said attempt to establish said wireless connection with said first access device, said processing unit to further:
affect an operation of a positioning function performed, at least in part, by said processing unit.

24. The mobile device as recited in claim 19, wherein said first access device and said second access device are provisioned, at least in part, as part of a wireless communication system.

25. The mobile device as recited in claim 24, wherein said first access device is provisioned, at least in part, to augment one or more other access devices of said wireless communication system.

26. The mobile device as recited in claim 19, wherein said first access device is provisioned, at least in part, as part of a first wireless communication system, and said second access device is provisioned, at least in part, as part of a second wireless communication system.

27. The mobile device as recited in claim 26, wherein said first wireless communication system comprises a wireless area network, and said second wireless communication system comprises a cellular communications network.

28. An article comprising:
a non-transitory computer readable medium having stored therein computer implementable instructions executable by a processing unit of a mobile device to:
identify an initial attribute of a signaling environment observed by said mobile device located within or proximate to a coverage area of a first access device, said initial attribute being based, at least in part, on a wireless signal transmitted by a second access device and acquired by said mobile device;
subsequently determine whether said mobile station is likely within or proximate to said coverage area based, at least in part, on said initial attribute and a current attribute of said signaling environment observed by said mobile device, said current attribute being based, at least in part, on a subsequent wireless signal transmitted by said second access device and acquired by said mobile device; and
initiate an attempt to establish a wireless connection with said first access device, in response to a determination that said mobile station is likely within or proximate to said coverage area;
wherein said first access device comprises a first wireless signal transceiver provisioned to operate in a first frequency band and said second access device comprises a second wireless signal transceiver provisioned to operate in a second frequency band.

29. The article as recited in claim 28, wherein said wireless signal transmitted by said second device comprises a position reference signal (PRS).

30. The article as recited in claim 28, wherein said initial attribute of said signaling environment is based, at least in part, on at least one of: a measured or estimated signal strength of said wireless signal, a measured or estimated phase of said wireless signal, a measured or estimated propagation distance of said wireless signal, a measured or estimated propagation time of said wireless signal, and/or a measured or estimated time of arrival of said wireless signal.

31. The article as recited in claim 28, said computer readable instructions being further executable by said processing unit to:
initiate a search for said first access device.

32. The article as recited in claim 28, said computer readable instructions being further executable by said processing unit to:

affect an operation of a positioning function.

33. The article as recited in claim 28, wherein said first access device and said second access device are provisioned, at least in part, as part of a wireless communication system.

34. The article as recited in claim 33, wherein said first access device is provisioned, at least in part, to augment one or more other access devices of said wireless communication system.

35. The article as recited in claim 28, wherein said first access device is provisioned, at least in part, as part of a first wireless communication system, and said second access device is provisioned, at least in part, as part of a second wireless communication system.

36. The article as recited in claim 35, wherein said first wireless communication system comprises a wireless area network, and said second wireless communication system comprises a cellular communications network.

* * * * *